United States Patent [19]

Miyakawa et al.

[11] E Patent Number: Re. 31,707

[45] Reissued Date of Patent: Oct. 16, 1984

[54] METHOD AND APPARATUS FOR ELECTRICALLY BIASING DEVELOPING ELECTRODE OF ELECTROPHOTOGRAPHIC DEVICE

[75] Inventors: Seiichi Miyakawa, Nagareyama; Tadahiro Eda, Yokohama, both of Japan

[73] Assignee: Ricoh Company, Ltd., Tokyo, Japan

[21] Appl. No.: 199,836

[22] Filed: Oct. 23, 1980

Related U.S. Patent Documents

Reissue of:

[64] Patent No.: 4,050,806
Issued: Sep. 27, 1977
Appl. No.: 575,328
Filed: May 7, 1975

[30] Foreign Application Priority Data

May 10, 1974 [JP] Japan ..... 49-52010
Jun. 14, 1974 [JP] Japan ..... 49-67714

[51] Int. Cl.[3] ..... G03G 15/10

[52] U.S. Cl. ..... 355/14 R; 118/648; 355/10; 430/103

[58] Field of Search ..... 355/3 R, 10, 14 R, 14 D; 118/647, 648

[56] References Cited

U.S. PATENT DOCUMENTS

| | | | |
|---|---|---|---|
| 3,611,982 | 10/1971 | Coriale et al. | 324/72 |
| 3,707,943 | 1/1973 | Matsumoto et al. | 355/10 X |
| 3,782,818 | 1/1974 | Smith | 355/10 |
| 3,788,739 | 1/1974 | Coriale | 355/3 R |
| 3,891,316 | 6/1975 | Whited | 355/14 |
| 3,892,481 | 7/1975 | Schaefer et al. | 355/14 |

*Primary Examiner*—Fred L. Braun
*Attorney, Agent, or Firm*—Guy W. Shoup; Gerard F. Dunne

[57] ABSTRACT

A photoconductive member is charged and radiated with a light image to produce an electrostatic image. Sensing electrodes automatically sense the remaining potential in a portion of the electrostatic image corresponding to a background area of the original document scanned to produce the light image. In one embodiment the area is a white reference document disposed adjacent to the original document. In another embodiment a reference document is not provided and a plurality of portions of the electrostatic image are sensed. The lowest value of the sensed potential is utilized. Computing means compute and apply the biasing voltage to the developing electrode as a predetermined function of the sensed potential.

22 Claims, 9 Drawing Figures

METHOD AND APPARATUS FOR ELECTRICALLY BIASING DEVELOPING ELECTRODE OF ELECTROPHOTOGRAPHIC DEVICE

Matter enclosed in heavy brackets [ ] appears in the original patent but forms no part of this reissue specification; matter printed in italics indicates the additions made by reissue.

The present invention relates to a method and apparatus for applying a biasing voltage to a developing electrode of an electrophotographic device.

In conventional electrophotographic copying methods employing photoconductor mediums having photoconductive insulating layers consisting of an organic semiconductor material, i.e., a so-called OPC photoconductor medium, it has been known that with continuous use of the OPC photoconductor medium, the remaining potential on the OPC photoconductor medium, i.e., the potential in areas corresponding to the background of an original document, tends to vary within a range of about 100–230 volts due to the effects of fatigue and wear of the OPC photoconductor medium, deterioration of the imaging light source, dirty imaging mirrors, the temperature of the developer solution, etc.

Developing methods have heretofore been proposed in which in consideration of the above-mentioned range of variation in the remaining potential, a predetermined bias potential is applied to the developing electrode so that only those image portions of the OPC photoconductor medium having a remaining potential higher than the applied bias potential are developed to prevent the background areas of the copies from being smeared.

A disadvantage of this type of conventional method is that while a bias is applied to the developing electrode to compensate for variations in the remaining potential on the OPC photoconductor medium in spite of the fact that the remaining potential on the photoconductor medium varies during continuous use in response to changes in the operating conditions of the copying apparatus, the valve of the applied bias potential is fixed, and the result is over-compensation or under-compensation. This makes it impossible to reproduce the low density image portions and fails to adequately prevent the background areas of the copies from being smeared.

A partial solution to this problem is proposed in U.S. Pat. No. 3,013,203 to Allen et al, in which an electroscope for measuring the remaining potential on the photoconductive medium or member is manually movable by the operator to sense the potential in a portion of the electrostatic image on the photoconductive member corresponding to a background area of the original document being electrophotographically reproduced. The major disadvantage of this prior art expedient is that the operation must be manually performed by the operator which is a nuisance. Another problem is the discharge of the photoconductive member as a function of time whereby the remaining potential is lower during the development of the electrostatic image than when it is measured by the operator prior to development by means of the electroscope.

It is therefore an object of the present invention to provide a method of automatically measuring the remaining potential in a portion of an electrostatic image on a photoconductive member corresponding to a background portion of an original document, and computing and applying a biasing voltage to a developing electrode as a predetermined function of the measured potential.

It is another object of the present invention to provide apparatus embodying the above method.

The above and other objects, features and advantages of the present invention will become clear from the following detailed description and accompanying drawings.

Exemplary embodiments of the present invention will now be described with reference to the accompanying drawings.

Figure 1:
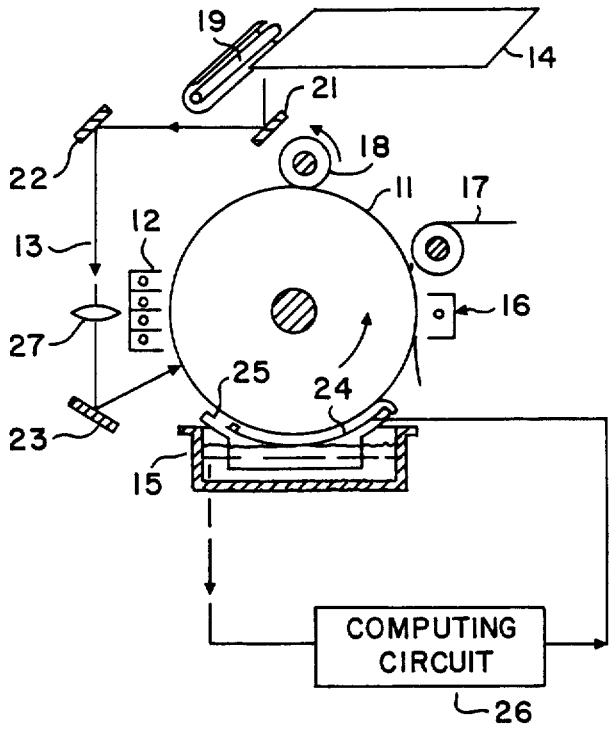
FIG. 1 is a schematic diagram of an electrophotographic device embodying apparatus in accordance with the present invention.

As shown in FIG. 1, an OPC photoconductor drum member or medium 11 is driven by a driving mechanism (not shown) to rotate at constant speed in the direction shown by an arrow, so that in a synchronized sequence during the rotation of the photoconductor medium 11, the photoconductor medium 11 is charged by a charging corona unit 12, the image of an original document 14 is radiated or projected onto the surface of the photoconductor medium 11 by an imaging unit 13, the resulting electrostatic image is developed by a developer unit 15, the resulting toner image is transferred to a transfer paper 17 by a transfer unit 16, and the photoconductor medium 11 is cleaned by a cleaning unit 18. In an exemplary form of the imaging unit 13, a lamp 19 illuminates the original document 14 and the reflected light is projected onto the surface of the photoconductor medium 11 through reflecting mirrors 21 and 22, a lens 27 and a reflecting mirror 23.

Figure 2:
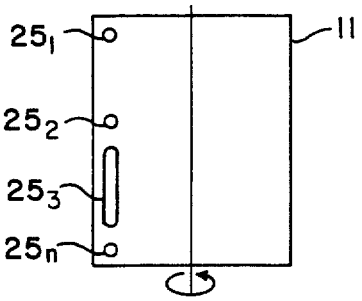
FIG. 2 is a schematic view of sensing means shown in FIG. 1.

The lamp 19 and the reflecting mirror 21 are moved to the right in synchronism with the photoconductor medium 11 rotation for scanning the original document 14. The developer unit 15 is adapted to develop the electrostatic image using a developing solution, and it comprises a developing electrode 24 and a sensing electrode 25 which are disposed in the developing solution. The sensing electrode 25 senses the remaining potential on the photoconductor medium 11 through the developing agent by means of electrostatic induction and the electrical conductivity of the developing agent, and it may, for example, be composed of a plurality of sensing electrodes $25_1$ through $25_n$ as shown in FIG. 2. It is to be noticed that the plurality of sensing electrodes $25_1$ through $25_n$ are different therebetween in size and in configuration, as shown. The outputs $V_1$ to $V_n$ (see FIG. 4) of the plurality of sensing electrodes $25_1$ through $25_n$ are applied to a computing circuit 26 so that the one of these outputs having the lowest value is selected as representative of the potential of a portion of the photoconductor medium 11 which corresponds to a background area of the original document 14, and the proper bias voltage or potential is applied to the developing electrode 24 in accordance with a predetermined function of the thus selected output.

Figure 4:
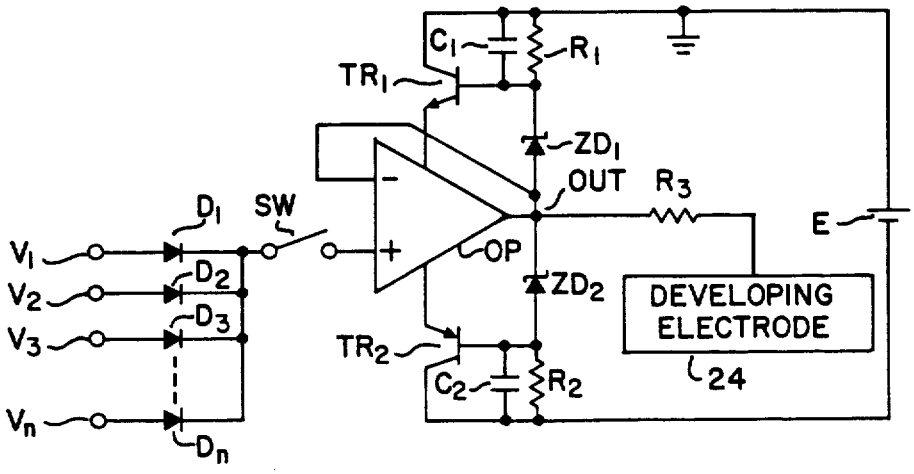
FIG. 4 is an electrical schematic diagram of computing means shown in FIG. 1.

The computing circuit 26 may be constructed as shown in the circuit diagram of FIG. 4. The cathodes of diodes $D_1$ through $D_n$ are connected to the noninverting input terminal of an operational amplifier OP, and the anodes of the diodes $D_1$ through $D_n$ are connected respectively to the sensing electrodes $25_1$ through $25_n$. The positive and negative supply terminals of the operational amplifier OP are respectively connected to the emitter of an NPN transistor $TR_1$ and the emitter of a PNP transistor $TR_2$. The collector of the transistor $TR_1$ is grounded, and the collector of the transistor $TR_2$ is connected to a negative DC power supply E. A parallel combination of a resistor $R_1$ and a capacitor $C_1$ and a parallel combination of a resistor $R_2$ and a capacitor $C_2$ are respectively connected between the collectors and bases of the transistors $TR_1$ and $TR_2$, and Zener diodes $ZD_1$ and $ZD_2$ are respectively connected between the base of the transistor $TR_1$ and an output terminal OUT of the operational amplifier OP and between the base of the transistor $TR_2$ and the output terminal OUT of the operational amplifier OP. Further, the output terminal OUT of the operational amplifier OP is connected to the inverting input terminal of the operational amplifier OP, and it is also connected to the developing electrode 24 through a resistor $R_3$.

Figure 5:
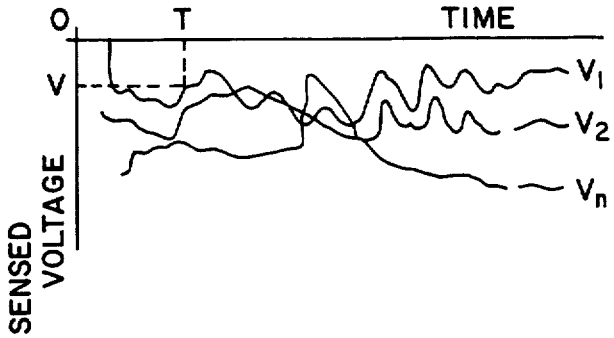
FIG. 5 is a graph illustrating the outputs of sensors shown in FIG. 1.

With the construction described above, the computing circuit 26 receives the outputs $V_1$ to $V_n$ of the sensing electrodes $25_1$ through $25_n$, which vary in accordance with the image of the original document 14 as shown in FIG. 5. The lowest one of the outputs $V_1$ to $V_n$ of the sensing electrodes $25_1$ through $25_n$ is selected by the diodes $D_1$ through $D_n$. The operational amplifier OP computes the correct biasing voltage as a predetermined function of the selected output $V_1$ to $V_n$ and applies the correct biasing voltage to the developing electrode 24 through the resistor $R_3$. The output of the DC power supply E is applied to the operational amplifier OP through the transistors $TR_1$ and $TR_2$ so that the supply voltage is maintained at a predetermined value by means of the Zener diodes $ZD_1$ and $ZD_2$.

The operational amplifier OP preferably has high input impedance so that toner particles will not be attracted to the sensing electrode $25_1$ to 25n. The computing circuit 26 may also be provided with a switch SW connected between the diodes $D_1$ to $D_n$ which constitute a comparator and the operational amplifier OP. In this case, the switch SW is normally open and momentarily closed by cam means (not shown) at a time T when the image portion of the photoconductor medium 11 just begins to pass by the sensors $25_1$ to $25_n$. The operational amplifier OP is provided with a memory element such as a capacitor (not shown) so that the operational amplifier OP will produce an output which is the predetermined function of its input when the switch SW is momentarily closed and maintain the output at the same value until the switch SW is closed again.

This operation is illustrated in FIG. 5. When the switch SW is closed at the time T, the output $V_1$ of the sensing electrode $25_1$ has the lowest voltage which is designated as V. This voltage V is applied to the operational amplifier OP through the $D_1$. The operational amplifier OP will apply the biasing voltage to the developing electrode 24 which is the predetermined function of the voltage V from the time T until the switch SW is closed again during the next reproduction operation.

If desired, the diodes $D_1$ to $D_n$ constituting the comparator may be replaced by comparator means adapted to sense the highest value of the outputs of the sensing electrodes $25_1$ to $25_n$ rather than the lowest value.

With the photoconductor medium 11, toner particles are attracted to and cling to those areas having a surface potential higher than the bias potential applied to the developing electrode 24, whereas toner particles are not attracted to the areas having a lower surface potential than the bias potential of the developing electrode 24 since the toner particles are attracted to and adhere to the developing electrode 24. The surface potential of the photoconductor medium 11 differs depending on the image pattern of the original document 14 and the background density of the original document 14. However, the lowest one of the outputs $V_1$ to $V_n$ of the plurality of sensing electrodes $25_1$ through $25_n$ may be considered to represent the surface potential of the photoconductor medium 11 corresponding to the background area density of the original document 14. Consequently, the quality of the copies produced by a method of this invention is not affected by the fatigue, wear and temperature of the photoconductor medium 11, variations in light intensity, the ambient temperature or the background density of the original document 14, and thus smearing of the background areas of the copies is prevented. Assuming that the sensing electrodes $25_1$ to $25_n$ are arranged relative to the image areas of the photoconductor medium 11 as shown in FIG. 2 so that the lowest one of the outputs of the sensing electrodes $25_1$ to $25_n$ is selected and the corresponding bias potential is applied to the developing electrode 24, the background area potential can be positively sensed even in the case of a high density image (an image occupying a large area) and a low density image (an image occupying a small area), and therefore both of these images can be reproduced excellently. Since the margin of an ordinary document is white, if at least one small sensing electrode is arranged at a position corresponding to such a white area, there is a greater possibility of sensing the minimum background area potential in the image areas of the photoconductor medium 11. Further, while the conventional copying methods a copy reproduced from an original document having printed or written letters or pictures on yellow, pink or blue paper or a newspaper will usually have highly smeared background areas, a method accordingly to the present invention ensures the positive sensing of the background area potential of an original document and hence it ensures tha production of copies having no smeared background areas.

Figure 3:
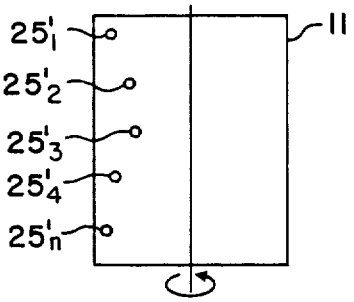
FIG. 3 is a schematic view of an alternative arrangement of the sensing means shown in FIG. 1.

Furthermore, while in the embodiment of the invention described hereinabove the plurality of sensing electrodes $25_1$ through $25_n$ is arranged in a straight line perpendicular to the direction or path of movement of the photoconductor medium 11 as shown in FIG. 2, electrodes $25'_1$ to $25'_n$ may be arranged in an irregular nonlinear manner as shown in FIG. 3. In this way, even if the original document 14 contains image areas arranged in the form of lines, all the sensing electrodes $25'_1$ to $25'_n$ will not be contained in these image areas and therefore the background area potential can be positively sensed. The background area potential may be sensed with greatest accuracy if a plurality of sensing electrodes are scattered as much as possible so that they are not all contained in an image area of an original document arranged in line form, and if as many small electrodes as possible are used. While in the embodiment described so far the present invention has been described as applied to wet type development, it may also be applied to dry type development in which case the remaining potential may be sensed by means of electrical conductivity and electrostatic induction through a developer (e.g., a developer composition comprising iron particles and toner particles or glass particles and toner particles). The remaining potential may also be sensed by means of electrostatic induction through a space to thereby sense the background area potential in the image areas of the photoconductor medium. In this case, however, since the remaining potential is sensed through the dry type developer, the potential sensed by the sensing electrodes is low compared to that sensed through a wet type developer. It is therefore necessary that the bias voltage applied to the developing electrode be compensated in consideration of the characteristics of the developer. It is a matter of course that similar compensation must be effected when the remaining potential is to be sensed through air and not through a developer. Further, the present invention may be similarly embodied by applying the proper bias potential to the developing electrode in any developing method in which a zinc oxide sensitized paper having an electrostatic image formed thereon is immersed in a wet type developer for developing the image.

It will thus be seen from the following that since in a developing method according to the present invention the surface potential in the image areas of a photoconductor medium is sensed by a plurality of sensing electrodes and a bias potential is applied to a developing electrode in accordance with the lowest one of the outputs of the sensing electrodes, the quality of the copies is not affected by fatigue and wear of the photoconductor medium, deterioration of the imaging light source, dirty imaging mirrors, the temperature of the developing solution or the background density of the original document. Thus, the background areas of copies are prevented from being smeared. Further, by arranging the plurality of sensing electrodes in a nonlinear manner with respect to the direction of movement of the photoconductor medium, it is possible to accurately sense the background area potential of the original document and thereby to prevent the smearing of the background areas of the copies. While in the embodiment described hereinabove the present invention has been described in connection with an OPC photoconductor medium, the present invention is particularly applicable to any electrophotographic copying process in which the non-image areas of a charged and imaged photoconductor medium have a high remaining potential.

The scope of the present invention includes a number of embodiments in which the remaining potential in a portion of the photoconductive member or medium having a predetermined value relative to the remaining potential in a portion of the photoconductive member corresponding to a background area of the original document is sensed and utilized to produce the correct developing electrode biasing voltage. In the embodiment shown in FIG. 1, the output of the sensing electrode having the lowest potential value is equal to the remaining potential corresponding to a background area. Another embodiment shown in FIG. 6 produces the same effect.

Figure 6:
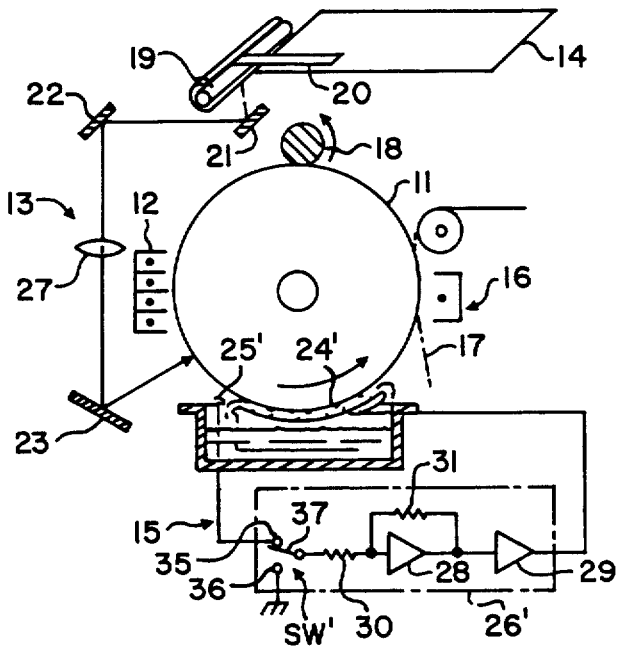
FIG. 6 is similor to FIG. 1 but shows an alternative embodiment of apparatus according to the present invention.

The embodiment shown in FIG. 6 is identical to the embodiment shown in FIG. 1 to the extent that similar elements are designated by the same reference numerals, and a repetitive description will not be given of these elements. The sensing electrode 25' and computing circuit 26' differ from those of the embodiment of FIG. 1, and in addition the embodiment of FIG. 6 is provided with a reference document 20 which is disposed next to the original document 14. During the operation of the imaging unit 13, light images of both the original and reference documents 14 and 20 respectively are projected onto the photoconductor medium 11 to form electrostatic images. Due to the configuration of the apparatus the electrostatic image of the reference document 20 will always be produced at a predetermined portion of the photoconductor medium 11. The sensing electrode 25' is identical in construction to any of the sensing electrodes $25_1$ to $25_n$ and is arranged so that the portion of the photoconductor medium 11 containing the electrostatic image of the reference document 20 is adjacent to the sensing electrode 25' when the cam means (not shown) opens a switch SW' in a manner described with reference to the embodiment of FIG. 1. Preferably, the reference document 20 is formed of the same material as the original document 14 such as, for example, white paper for a white original document 14. Colored paper may be used for the reference document 20 if the original document 14 is colored.

If the reference document 20 is white and the original document 14 is colored, the computing circuit 26' may be provided with a switch (not shown) which is manually changable by the apparatus operator to change the predetermined function of the computing circuit 26' to compensate for the difference in background area density. In this case, the potential sensed by the sensing element 25' will not be equal to the potential corresponding to a background area of the original document 14 but will be a value relative thereto which can be predetermined if the optical densities of the original and reference documents 14 and 20 respectively are known.

The computing circuit 26' shown in FIG. 6 comprises the switch SW' (optional) which is substantially similar to the switch SW employed in the computing circuit 26, and which comprises a first fixed contact 35 connected to the sensing electrode 25', a second fixed contact 36 grounded and a movable contact 37 connected to one end of a resistor 10. The other end of the resistor 30 is connected to the input of an operational amplifier 28, the output of which is connected to the input of another operational amplifier 29. The output of the operational amplifier 29 is connected to the developing electrode 24'. A feedback resistor 31 is connected between the input and output of the operational amplifier 28 to determine the predetermined function in a manner well known in the art.

It is to be noticed that if the movable contact 37 of the switch SW' is connected to the fixed contact 36 so that the developing electrode 24' is grounded, tonor particles which are undesirably adhesive to the developing electrode 24' are attracted to the photoconductive medium 11 to thereby perform cleaning of the developing electrode 24'. In this connection, an electric potential of a polarity opposite to that of the electrostatic image potential may be applied to the developing electrode 24' through the switch SW' having a third fixed contact (not shown) connected to a suitable power source (not shown) to thereby facilitate the cleaning of the developing electrode 24'.

Figure 7:
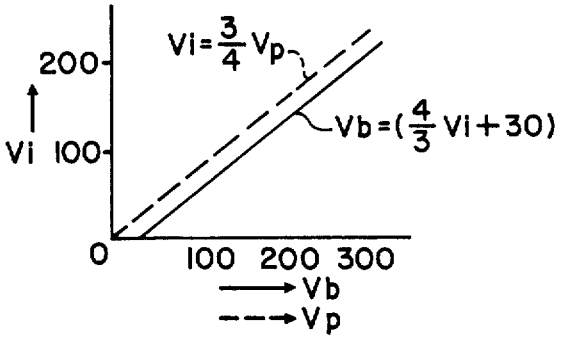
FIG. 7 is a graph illustrating the operation of computing means shown in FIG. 6.

An example of the computation of the predetermined function as performed by either of the computing circuits 26 and 26' is shown in FIG. 7. The abscissa represents both the remaining potential Vp in the portion of the photoconductor medium 11 containing the electrostatic image of the reference document 20 and sensed by the sensing electrode 25' and the biasing voltage Vb applied to the developing electrode 24' by the computing circuit 26'. If the voltage Vi, as represented by the ordinate in FIG. 7, appearing at the input of the operational amplifier 28 has the exemplary value $$Vi = \tfrac{2}{3}Vp$$

the operational amplifiers 28 and 29 are arranged to perform the following computation $$Vb = (\tfrac{3}{2}Vi + 30) \text{ volts}$$

Combining the above equations produces the result $$Vb = Vp + 30 \text{ volts}$$

It will be seen that the biasing voltage Vb applied to the developing electrode 24' is slightly higher (30 volts) than the remaining potential Vp in the background areas of the original document 14 to positively prevent smearing of the background areas. The biasing voltage Vb may be made equal to the remaining potential Vp or have any other relative value as desired.

Figure 9:
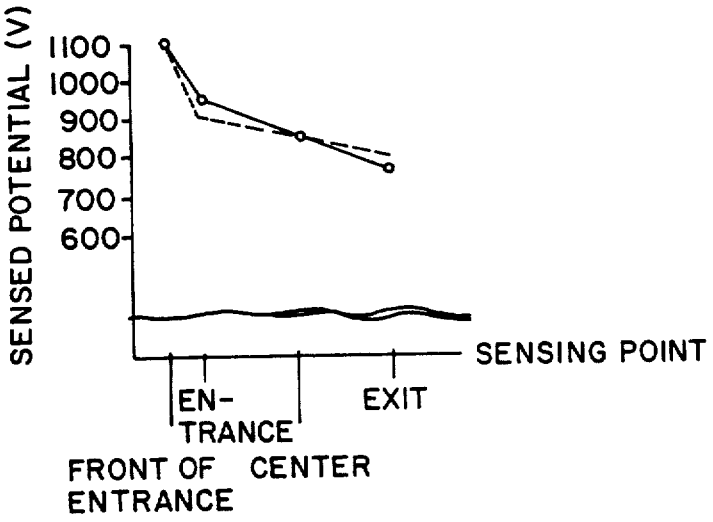
FIG. 9 is a graph illustrating the operation of the computing and sensing means shown in FIG. 8.

Another aspect of the present invention is illustrated in FIG. 9. If the sensing electrode 25' is moved along the path of the photoconductor medium 11 so that the sensing point is in front of the entrance to the developing unit 15, at the entrance, at the center and at the exit thereof, the curves of FIG. 9 will result. It will be seen that the sensed potential decreases as a function of time. The curve in solid line is for a strong developing agent and the curve in broken line is for a weak developing agent. For this reason, it is desirable to have the biasing voltage of the developing electrode 24' decrease in a similar manner along the path of movement of the photoconductor medium 11.

Figure 8:
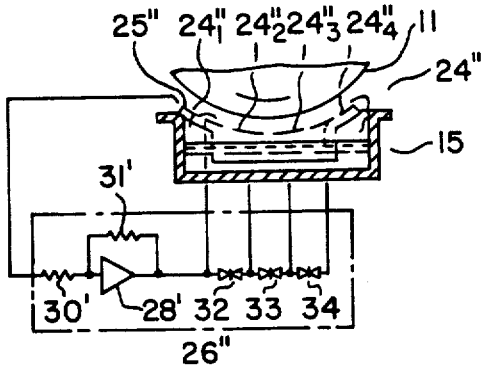
FIG. 8 is a fragmentary schematic view of a modification of computing and sensing means shown in FIG. 6.

This function is provided by the embodiment of the invention shown in FIG. 8. The computing circuit 26" is further modified to comprise varistors 32, 33 and 34 connected in series to the output of the operational amplifier 28' in such a manner that the voltage at the output of the operational amplifier 28' is dropped by the varistors 32 to 34. The developing electrode 24" is formed in sections $24''_1$ to $24''_4$ which are connected to the junction of the output of the operational amplifier 28' and the varistor 32, the junction of the varistors 32 and 33, the junction of the varistors 33 and 34 and the end of the varistor 34 respectively. The biasing voltage applied to the sections $24''_1$ to $24''_4$ are thereby predetermined functions of both the sensed remaining potential and the position of the respective section $24''_1$ to $24''_4$ along the path of the photoconductor medium 11. The arrangement of the developing electrode 24', sensing electrode 25" and computing circuit 26" may be applied to the embodiment shown in FIG. 1 if desired. Although the operational amplifier 29 is omitted in the computing circuit 26", it may be provided if desired.

Many other modifications within the scope of the present invention will become apparent to those skilled in the art.

What is claimed is:

1. A method of electrically biasing a developing electrode disposed closely adjacent to a photoconductive member of an electrophotographic device after the photoconductive member has been charged and exposed to a light image, comprising the steps of:

a. automatically sensing *with a plurality of sensors* the potential remaining at a plurality of respective portions of the photoconductive member and automatically selecting the lowest value of the sensed potential; and b. automatically applying biasing voltage to the developing electrode in accordance with the lowest value of the sensed potential.

2. The method of claim 1, further comprising the step of:

c. computing the biasing voltage in accordance with the lowest valve of the sensed potential between steps (a) and (b).

3. The method of claim 1, in which the electrophotographic device includes a reference document disposed adjacent to an original document for reproduction whereby the light image applied to the photoconductive member includes a light image of the original document and a light image of the reference document so that an electrostatic image of the reference document is produced at a predetermined portion of the photoconductive member, step (a) being characterized by automatically sensing the potential at the predetermined portion of the photoconductive member containing the electrostatic image of the reference document.

4. The method of claim 1, in which the developing electrode is formed in a plurality of sections, step (b) being characterized by automatically applying biasing voltages to the sections of the developing electrode which are respectively predetermined in accordance with the lowest value of the sensed potential.

5. The method of claim 1, in which the photoconductive member is movable relative to the developing electrode and the developing electrode is formed in sections disposed along the path of movement of the photoconductive member, step (b) being characterized by applying biasing voltages to the sections of the developing electrode which are respectively predetermined in accordance with both the lowest value of the sensed potential and the position of the respective section along the path of movement of the photoconductive member.

6. In an electrophotographic device having a photoconductive member, charging means for charging the photoconductive member, imaging means for radiating a light image of an original document onto the photoconductive member and a developing electrode disposed closely adjacent to the photoconductive member after the photoconductive member has been charged by the charging means and radiated with the light image by the imaging means, apparatus for electrically biasing the developing electrode comprising:

sensing means comprising a plurality of sensors for automatically sensing the potential remaining at a plurality of respective portions of the photoconductive member; and computing means comprising a comparator for automatically selecting the output of the sensor having the lowest value of the sensed potential, automatically computing the [viasing] *biasing* voltage to be applied to the developing electrode in accordance with the lowest value of the sensed potential and applying said biasing voltage to the developing electrode.

7. The apparatus of claim 6, further comprising:

a reference document disposed adjacent to the original document so that the imaging means produces an electrostatic image of the reference document at a predetermined portion of the photoconductive member, the sensing means being arranged to sense the potential remaining at the portion of the photoconductive member containing the electrostatic image of the reference document.

8. The apparatus of claim 6, in which the computing means comprises an operational amplifier.

9. The apparatus of claim 8, in which the operational amplifier has high input impedance.

10. The apparatus of claim 8, in which the computing means further comprises a switch which is connected between the sensing means and the operational amplifier.

11. The apparatus of claim 10, in which the switch comprises a first fixed contact connected to the sensing means, a second fixed contact grounded and a movable contact connected to the operational amplifier.

12. The apparatus of claim 11, in which the switch further comprises a third fixed contact connected to a power source.

13. The apparatus of claim 7, in which the developing electrode is formed in a plurality of sections, the computing means being operative to apply biasing voltages to the sections of the developing electrode as which are respectively predetermined in accordance with the lowest value of the sensed potential.

14. The apparatus of claim 7, in which the photoconductive member is movable relative to the developing electrode and the developing electrode is formed in sections disposed along the path of movement of the photoconductive member, the computing means being operative to compute and apply biasing voltages to the sections of the developing electrode which are respectively predetermined in accordance with both the lowest value of the sensed potential and the positions of the sections along the path of the photoconductive member.

15. The apparatus of claim 14, in which the photoconductive member is a rotary drum.

16. The apparatus of claim 7, in which the sensing means are arranged at a position corresponding to image areas of the photoconductive member.

17. The apparatus of claim 7, in which the computing means comprises an operational amplifier to compute the biasing voltage and the comparator comprises a plurality of diodes connected at one end to an input of the operational amplifier and at their other ends to the sensors respectively.

18. The apparatus of claim 7, in which the plurality of sensors are different therebetween in size and in configuration.

19. The apparatus of claim 7, in which the photoconductive member is movable relative to the developing electrode, the sensors being spaced in a direction perpendicular to the path of movement of the photoconductive member.

20. The apparatus of claim 19, in which the sensors are also spaced along the path of movement of the photoconductive member.

21. The apparatus of claim 19, in which the spacing of the sensors is irregular.

22. In an electrophotographic device having a photoconductive member, charging means for charging the photoconductive member, imaging means for radiating a light image of an original document onto the photoconductive member and a developing electrode disposed closely adjacent to the photoconductive member after the photoconductive member has been charged by the charging means and radiated with the light image by the imaging means, apparatus for electrically biasing the developing electrode comprising:

sensing means for automatically sensing the potential remaining on the photoconductive member at a portion thereof where the potential has a predetermined value relative to the minimum potential remaining on the photoconductive member; and computing means to automatically compute the biasing voltage to be applied to the developing electrode as a predetermined function of the sensed potential and apply said biasing voltage to the developing electrode, said computing means comprising an operational amplifier and *means including* a switch, *for providing a cleaning potential to said developing electrode,* said switch being connected between the sensing means and the operational amplifier, said switch comprising a first fixed contact connected to the sensing means and a second fixed contact grounded and a movable contact connected to the operational amplifier.

* * * * *